United States Patent Office 2,848,861
Patented Aug. 26, 1958

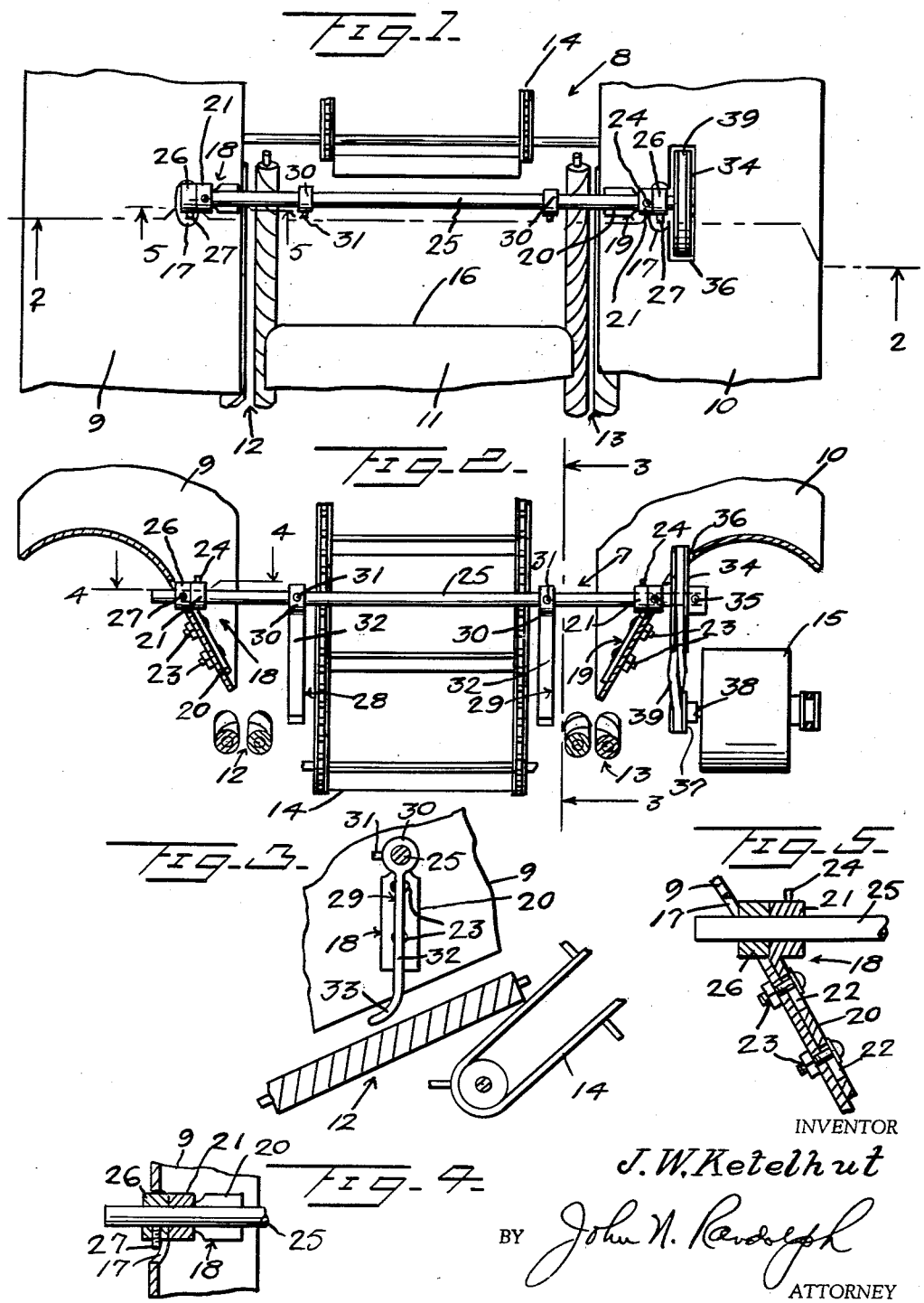

2,848,861

TRASH REMOVER FOR A TWO ROW CORN PICKER

John W. Ketelhut, Pukwana, S. Dak.

Application January 18, 1957, Serial No. 634,862

3 Claims. (Cl. 56—105)

This invention relates to a trash remover for a two row corn picker and is readily adapted to constitute a part of a corn picker, as manufactured, but which is so constructed that it may be readily applied as an attachment to corn pickers already in use and with only slight modification to the conventional corn picker.

More particularly, it is an aim of the present invention to provide a trash removing or clearing attachment for clearing trash such as corn stalks and leaves adjacent the lower end of the elevator where such trash tends to accumulate so that the trash will either be carried upwardly by the elevator or will be discharged rearwardly from the corn picker on either side of the elevator.

More particularly, it is a primary object of the present invention to provide a trash remover which will eliminate the necessity of the operator reaching into the corn picker with his hand and arm to clear away the trash from adjacent the lower end of the elevator, to thus obviate the risk of injuries which frequently occur to the operator in attempting to clear away the trash while the corn picker is in operation.

Still a further object of the invention is to provide a trash remover which will prevent accumulation of trash at the lower end of the elevator and thus improve the operation of the corn picker.

Various other objects and advantages of the invention will hereinafter become more fully apparent from the following description of the drawing, illustrating a presently preferred embodiment thereof, and wherein:

Figure 1 is a fragmentary top view of a portion of a two row corn picker, shown equipped with the trash clearing attachment;

Figure 2 is a cross sectional view taken substantially along a plane as indicated by the line 2—2 of Figure 1;

Figure 3 is an enlarged fragmentary vertical sectional view, taken substantially along a plane as indicated by the line 3—3 of Figure 2;

Figure 4 is an enlarged fragmentary horizontal sectional view taken substantially along a plane as indicated by the line 4—4 of Figure 2, and Figure 5 is an enlarged fragmentary vertical sectional view, taken substantially along a plane as indicated by the line 5—5 of Figure 1.

Referring more specifically to the drawing, in order to illustrate a preferred application and use of the trash remover, designated generally 7 and comprising the invention, a portion of a conventional two row corn picker, designated generally 8, has been illustrated including portions of the left side shield 9 and right side shield 10, as viewed from front to rear of the corn picker 8, as well as a portion of the center shield 11, the rear ends of two pairs of snapping rolls 12 and 13, the lower end of the elevator 14 and the blower 15. The parts 9 through 15 are all of conventional construction. The portion of the corn picker 8 as illustrated is modified to the extent that the rear portion of the center shield 11 is cut away so that the rear edge 16 thereof is spaced a substantial distance forward with respect to the elevator 14. The corn picker 8 is normally provided with a brace, not shown, which extends between and is secured to the side shields 9 and 10, end portions of which normally extend through transversely aligned openings 17 in said shields 9 and 10.

The trash remover 7 includes a pair of bearing brackets 18 and 19, each of which includes an elongated rigid metal strap member 20 to the upper end of which is secured a bearing 21. Each strap member 20 is provided with a pair of longitudinally spaced, longitudinally elongated slots 22. The strap members 20 are disposed against the adjacent sides of the shields 9 and 10, beneath the openings 17 therein, and nut and bolt fastenings 23 extend through the slots 22 in said shield sides for securing the bearing bracket 18 to the shield 9 and the bearing bracket 19 to the shield 10. The strap members 20 are thus secured to the shields 9 and 10 by the fastenings 23 to support the bearings 21 thereof in alignment with the openings 17, and the slots 22 enable the bearing brackets 18 and 19 to be vertically adjusted relative to the side shields to position the bearings 21 in correct alignment with one another. The bearings 21 are preferably each provided with a lubricating fitting 24 for lubricating the portions of a shaft 25 which are journalled in and supported by said bearings 21. A shaft 25 extends between and is journaled in the bearings 21 and includes end portions which extend outwardly from the bearings through the openings 17 of the shields 9 and 10. Collars 26 are secured by setscrews 27 to the end portions of the shaft 25 and bear against remote sides of the bearings 21 to prevent sliding movement of said shaft relative to the bearings. The collars 26 also function with the shaft 25 and the bearing brackets 18 and 19 as a brace to prevent displacement of the side shields 9 and 10 away from one another.

A pair of trash removing fingers or paddles 28 and 29 are supported by the shaft 25 for rotation therewith. Each of said fingers has an eye 30 at its upper end which fits loosely on the shaft 25 and is adjustably secured thereto by a setscrew 31. The fingers or paddles 28 and 29 also each comprises an elongated substantially rigid metal strip 32 which projects radially from a portion of the eye 30 thereof and which terminates in a curved free end 33, as best seen in Figure 3.

A relatively large belt pulley 34 is secured by a setscrew 35 to the end of the shaft 25 which projects through the opening 17 of the shield 10. Said shield 10, if necessary, is provided with an opening 36 into which the upper portion of the pulley 34 loosely extends. A belt pulley 37, of a smaller diameter than the belt pulley 34, is secured to the inner end of the shaft 38 of the blower 15. The pulleys 34 and 37 are connected by an endless belt 39 the flights of which cross between said pulleys, as seen in Figure 2.

When the blower 15 is operating, the belt pulley 34 and shaft 25 are driven by the blower shaft 38 in a counterclockwise direction, as seen in Figure 3, so that the trash removing fingers or paddles 28 and 29 will be revolved counterclockwise. The ends 33 of said fingers or paddles are curved rearwardly or away from the direction of rotation thereof so that corn stalks and leaves engaged by the fingers will not cling thereto. The fingers 28 and 29 are of a length, as measured from the shaft 25 to their tips 33, so as to clear the snapping rolls 12 and 13 sufficiently so that the ears of corn passing inwardly from the snapping rolls will not be struck by the fingers. The fingers may be adjustably positioned as desired on the shaft 25 but are preferably disposed as illustrated in the drawing with said fingers spaced inwardly with respect to the two pairs of snapping rolls 12 and 13 and outwardly with respect to the side edges of the elevator 14. The ends 33 of the fingers will engage any trash which tends to accumulate at the lower end of the elevator 14 for moving such trash up the elevator or for discharging the trash rearwardly of the corn picker on either side of the elevator. The center shield 11 is cut back as seen at 16 to provide sufficient clearance for rotation of the fingers 28 and 29. It will thus be apparent that the trash remover 7 will function to maintain the corn picker 8 clear of trash at all times adjacent the lower end of the elevator 14, so that operation of the corn picker will not be obstructed by an accumulation of trash adjacent the lower end of the elevator and which ordinarily causes considerable difficulty, especially in dry weather, and has in the past required removal of such trash usually by hand and with the risk of injury to the hand and arm of the operator if the corn picker parts are in operation.

The fingers 28 and 29 are shown extending in the same direction from the shaft 25. However, said fingers could be positioned to extend in opposite directions so that one finger would be in an uppermost position when the other finger was in a depending position.

Various modifications and changes are contemplated and may be resorted to, without departing from the function or scope of the invention as hereinafter defined by the appended claims.

I claim as my invention:

1. A trash removing attachment for a two row corn picker having a driven part, side shields, snapping rolls and an elevator operatively associated therewith, comprising bearing members adapted to be secured to the side shields, a shaft extending between and journaled in said bearing members and adapted to be supported thereby above the snapping rolls, a pair of trash clearing fingers fixed to and projecting radially from the shaft between the bearing members, and means connected between said driven part and the shaft for revolving the shaft and fingers, said fingers being rotated in a direction for propelling trash upwardly and rearwardly relative to the snapping rolls and elevator, said fingers being of a length such that the free ends thereof move in close proximity to portions of the snapping rolls and the elevator.

2. A trash removing attachment as in claim 1, and means adjustably securing said fingers to the shaft for variably positioning the fingers relative to one another and to the snapping rolls and elevator.

3. A trash removing attachment as in claim 1, and collars secured to said shaft and bearing against remote sides of said bearing members for cooperating therewith and with a portion of the shaft disposed between the bearing members for bracing the side shields.

References Cited in the file of this patent

UNITED STATES PATENTS

| | | |
|---|---|---|
| 2,340,084 | Scranton | Jan. 25, 1944 |
| 2,697,321 | Diehl | Dec. 21, 1954 |